United States Patent
Nagakura et al.

(10) Patent No.: US 9,312,716 B2
(45) Date of Patent: Apr. 12, 2016

(54) BATTERY CHARGING SYSTEM

(75) Inventors: Hayato Nagakura, Atsugi (JP); Isamu Kazama, Odawara (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 665 days.

(21) Appl. No.: 13/702,820

(22) PCT Filed: Jun. 7, 2011

(86) PCT No.: PCT/JP2011/003209
§ 371 (c)(1),
(2), (4) Date: Dec. 7, 2012

(87) PCT Pub. No.: WO2011/155185
PCT Pub. Date: Dec. 15, 2011

(65) Prior Publication Data
US 2013/0082519 A1    Apr. 4, 2013

(30) Foreign Application Priority Data

Jun. 9, 2010   (JP) .................................. 2010-131978
Apr. 18, 2011  (JP) .................................. 2011-091896

(51) Int. Cl.
*H02J 7/00*    (2006.01)
*B60L 11/18*   (2006.01)
*H02J 7/04*    (2006.01)

(52) U.S. Cl.
CPC ........... *H02J 7/0068* (2013.01); *B60L 11/1816* (2013.01); *H02J 7/045* (2013.01); *Y02T 10/7005* (2013.01); *Y02T 90/14* (2013.01)

(58) Field of Classification Search
CPC ..... H02J 7/0068; H02J 7/045; B60L 11/1816; Y02T 10/7005; Y02T 90/14
USPC .......................................................... 307/9.1
See application file for complete search history.

(56) References Cited

U.S. PATENT DOCUMENTS

| 2010/0085057 A1 * | 4/2010 | Nishi et al. ..................... 324/427 |
| 2010/0318250 A1 | 12/2010 | Mitsutani |
| 2012/0268066 A1 | 10/2012 | Endo et al. |

FOREIGN PATENT DOCUMENTS

| JP | 5-78152 U | 10/1993 |
| JP | 8-230441 A | 9/1996 |
| JP | 2009-71902 A | 4/2009 |
| JP | 2011-83076 A | 4/2011 |

(Continued)

OTHER PUBLICATIONS

Japanese Office Action, Jan. 27, 2015, 4 pages.

(Continued)

*Primary Examiner* — Thienvu Tran
*Assistant Examiner* — Kevin J Comber
(74) *Attorney, Agent, or Firm* — Foley & Lardner LLP

(57) ABSTRACT

A battery charging system includes a battery, a load and a controller to control supply power to be supplied from an external power source to the battery and the load, in accordance with a request charging power and a request load power. The controller limits power supplied from the external power source to the battery to an allowable battery power, and distributes the supply power from the external power source between the battery and the load in a state holding limitation of limiting the supply power from the external power source to the allowable battery power when a request for the supply of power to the load is generated.

13 Claims, 10 Drawing Sheets

(56) References Cited

FOREIGN PATENT DOCUMENTS

| WO | WO 2009/034872 A1 | 3/2009 |
| WO | WO 2011/024532 A1 | 3/2011 |

OTHER PUBLICATIONS

Korean Office Action, Feb. 25, 2014, 4 pages.

\* cited by examiner

BATTERY CHARGING SYSTEM

TECHNICAL FIELD

The present invention relates to a battery charging system.

BACKGROUND ART

JP H08(1996)-230441A (Application No. 1995-37164) shows a battery system arranged to perform a charging operation of charging an in-vehicle battery installed in an electric vehicle and a driving operation of driving at least one of various loads such as an air conditioner for adjusting an inside temperature of the vehicle during the charging operation, by supplying power from an external power source to the battery and the load. In order not to hamper the charge of the battery, this battery system is basically arranged to supply power to the air conditioner by using a surplus power excluding power required by the battery from the available power which the external power source can supply.

DISCLOSURE OF INVENTION

However, the above-mentioned battery system encounters a following problem in some cases when an air conditioner driven by the surplus power is a PWM pulse-driven air conditioner, and power is supplied to the load of the air conditioner with the surplus power while performing the power supply to the battery preferentially. Since the power consumed by the pulse-driven air conditioner varies periodically in a pulse waveform, the consumed power of the air conditioner decreases periodically below an air conditioner driving power for driving the air conditioner. In this case, part of the power to be used for driving the air conditioner is not consumed by the air conditioner, but supplied to the battery in addition to the power required by the battery. As a result, the power supplied to the battery exceeds the allowable charging power which the battery can allow, and hence the voltage of the battery becomes higher than an upper limit voltage of the battery.

Moreover, the above-mentioned earlier technology proposes the construction arranged to decrease the charging current supplied to the in-vehicle battery temporarily at the time of start of the drive of the air conditioner in order to meet spike current produced at the time of the start. However, the battery system is arranged to supply the power to the battery preferentially after a temporary decrease of the battery charging current at the time of start of the air conditioner. Therefore, it is not possible to avoid the above-mentioned problem.

It is an object of the present invention to provide a battery charging system which performs a charging operation of the battery and a power supplying operation to the load adequately by distributing external power between the charging operation of the battery and the power supply of the load, and effectively prevents the battery voltage from exceeding a predetermined upper limit voltage.

A battery charging system according to the present invention is configured to limit power supplied to a battery to an allowable battery power, and to distribute the supply power from an external power source between the battery and a load in a state holding limitation of limiting the supply power from the external power source to the allowable battery power when a request for the supply of power to the load is generated.

BEST MODES FOR CARRYING OUT THE INVENTION

Figure 1:
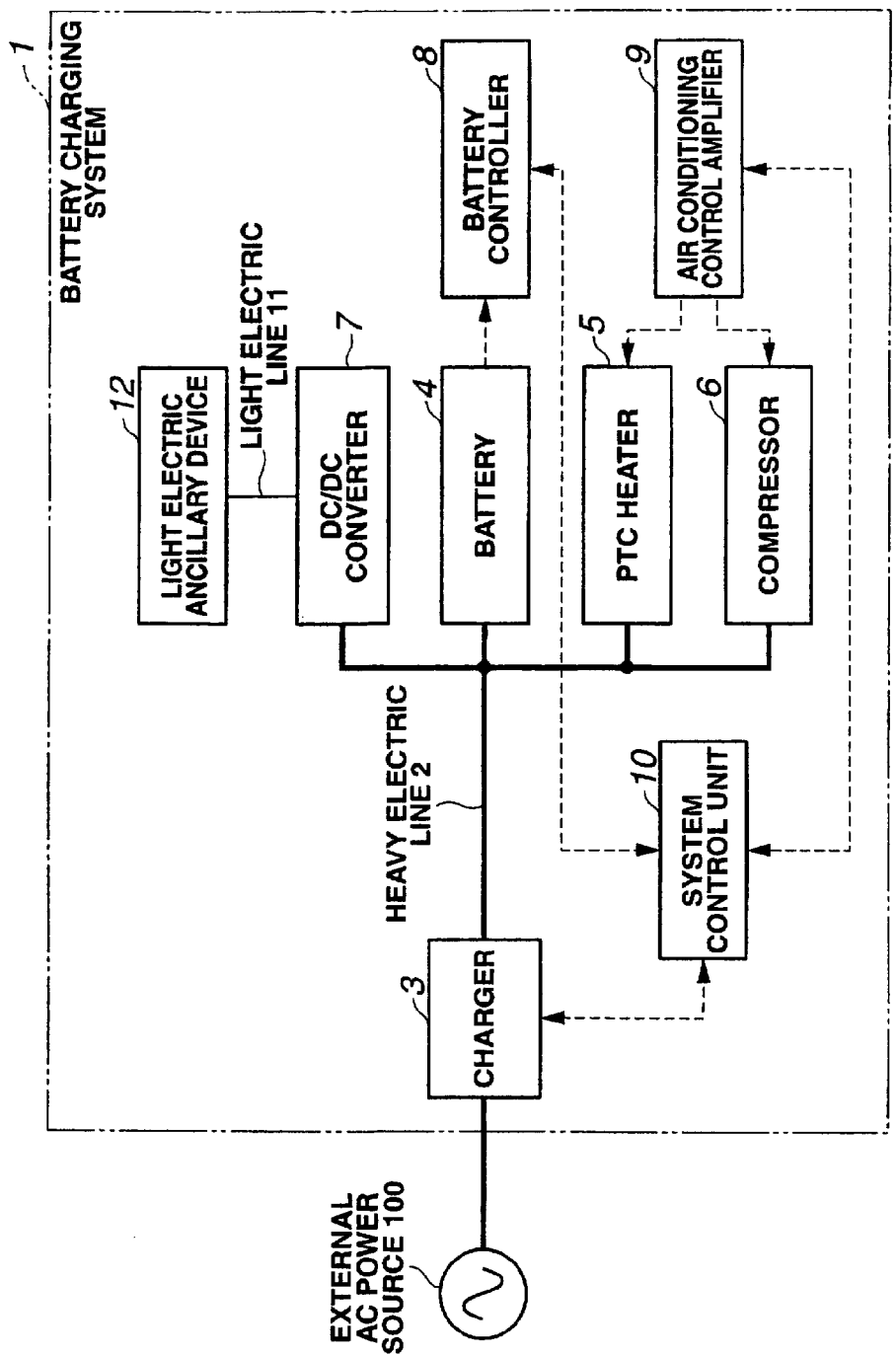
FIG. 1 is a view showing the construction of a battery charging system according to one embodiment of the present invention.

FIG. 1 shows a battery system according to an embodiment of the present invention. In this embodiment, the battery system is a battery charging system which, in the illustrated example, is used for a vehicle, such as a hybrid vehicle or an electric vehicle (EV), using electricity as driving power. However, the present invention is not limited to this.

The battery charging system 1 shown in FIG. 1 includes a charger 3, a battery 4, a PTC heater 5, a compressor 6 and a DC/DC converter 7, which are connected with one another by a heavy electric line 2. Battery charging system 1 is adapted to be connected electrically with an external AC power source 100 by heavy electric line 2. In general, external AC power source 100 is connected with the battery charging system 1 to charge the battery 4 through heavy electric line 2.

The battery 4 of this example is an assembled battery including a combination of secondary batteries such as lithium ion batteries. As shown in FIG. 1, battery 4 is connected with a battery controller 8 configured to monitor cells constituting battery 4. In this example, the battery 4 is an in-vehicle battery to be installed in a vehicle.

Battery controller 8 periodically senses a voltage of each of the cells of battery 4, a total voltage of battery 4, and a charge/discharge current of battery 4. From these sensed conditions, battery controller 8 calculates a SOC (state of charge) of battery 4, an upper limit charging voltage $V_{U\text{-}LIM}$ of battery 4, and an allowable charging power $P_{LIM}$ which is a charging power which can be allowed by the battery 4. The upper limit charging voltage $V_{U\text{-}LIM}$ is a voltage used as an upper limit in charging battery 4. The upper limit charging voltage $V_{U\text{-}LIM}$ can be calculated, from the SOC of battery 4 and an internal resistance of battery 4, as a preset upper limit voltage for preventing deterioration of battery 4. For example, it is possible to set the upper limit charging voltage $V_{U\text{-}LIM}$ equal to a voltage at which deposition or precipitation of lithium begins in each of the cells (or part of the cells), or equal to a voltage lower by a predetermined value than the voltage at which the deposition of lithium begins. However, the setting of upper limit voltage is not limited to these methods.

The allowable charging power $P_{LIM}$ is a charging power allowable by battery 4, and normally set at such a power as to prevent the total voltage of batter 4 from exceeding the above-mentioned upper limit charging voltage $V_{U\text{-}LIM}$ when charging power is supplied to battery 4. When the SOC of battery 4 increase, the total voltage of battery 4 increases, and hence the total voltage nears the upper limit charging voltage $V_{U\text{-}LIM}$. Therefore, the upper limit charging voltage $V_{U\text{-}LIM}$ generally decreases with increase of SOC of battery 4 and the upper limit charging voltage $V_{U\text{-}LIM}$ increases with decrease of SOC of battery 4.

The battery controller 8 determines a charging power to be supplied to battery 4 in accordance with the allowable charging power $P_{LIM}$, within the range of allowable charging power $P_{LIM}$, and sends the thus-determined charging power, as a request charging power $P_{BAT}$, to a system control unit 10, together with the allowable charging power PLIM and the SOC of battery 4.

The PTC heater 5 is a heater arranged to be driven by power supplied through the heavy electric line 2, from battery 4 or the external AC power source 100, and thereby to heat an air conditioning air to be supplied into a compartment such as a passenger compartment of the vehicle equipped with this battery charging system. PTC heater 5 has a characteristic called PTC characteristic such that, with an increase of the temperature of a heater element, the electric resistance increases and the power consumption decreases.

In the illustrated example, PTC heater 5 includes a first (PTC) heater driven by power of a pulse waveform in a PWM control mode, and a second (PTC) heater driven by constant power. PTC heater 5 can control a heat generation quantity per unit time by controlling a duty ratio or duty factor of the pulse waveform for driving the first heater, and thereby adjust the temperature of the air conditioning air to be supplied to the compartment of the vehicle. The PWM control of PTC heater 5 is performed under the command of the system control unit 10.

Figure 2:
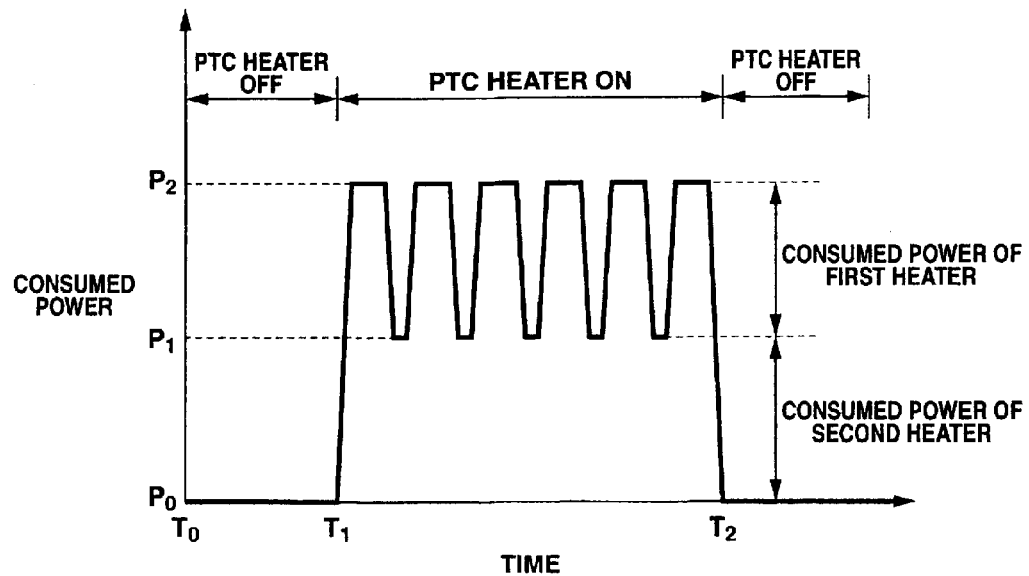
FIG. 2 is a view showing the consumed power of a PTC heater 5 shown in FIG. 1.

FIG. 2 shows a consumed power of PTC heater 5 when electric power is supplied from the heavy electric line 2. FIG. 2 shows, as an example, three consecutive periods. The first period ($T_0$~$T_1$) is an OFF period during which power is not supplied to PTC heater 5 (PTC heater OFF). The second period ($T_1$~$T_2$) is an ON period during which power is supplied at $P_2$ from battery 4 or from external AC power source 100 through heavy electric line 2 (PTC heater ON). The third period is an OFF period during which the supply of power is stopped (PTC heater OFF). The supply of power is started at instant $T_1$, and terminated at instant $T_2$.

As shown in FIG. 2, when power is supplied at a level $P_2$ from battery 4 or external ac power source 100 through heavy electrical line, and PTC heater 5 is ON, the consumed power of the second heater is held constant at a level $P_1$ whereas the consumed power of the PWM pulse-driven first heater is varied periodically between the state in which the consumed power is $P_2$-$P_1$ and the state in which the consumed power is 0. Therefore, the total consumed power of PTC heater 5 is varied periodically between the state in which the consumed power is $P_2$ and the state in which the consumed power is $P_2$-$P_1$. Thus, the system alternates between the state in which all the power P2 supplied through the heavy electric line 2 is consumed, and no surplus power is left, and the state in which only the power $P_1$ in the power $P_2$ supplied through the heavy electric line 2 is consumed, and the surplus power ($P_2$-$P_1$) is left over.

The compressor 6 is a refrigerant compressor for compressing a refrigerant in a refrigerating cycle (not shown) in the air conditioner provided in the vehicle. Compressor 6 is driven by the supply of power $P_2$ through the heavy electric line 2 from battery 4 or external ac power source 100.

An air conditioning control amplifier 9 is a control device for controlling the PTC heater 5 and compressor 6. For example, air conditioning control amplifier 9 obtains information on an inside temperature inside the compartment sensed by a temperature sensor (not shown) and information on a target temperature for air conditioning of the inside of the compartment. In accordance with the obtained information, air conditioning control amplifier 9 determines a request driving power required to drive the PTC heater 5 and compressor 6, and sends the thus-determined request driving power, as request driving power $P_{AC}$, to the system control unit 10.

The DC/DC converter 7 is a device to convert the power supplied from battery 4 through heavy electric line 2. The power converted by DC/DC converter 7 is supplied through a light electric line 11, to a light electric ancillary device 12.

The charger 3 receives a power supply command from system control unit 10. In accordance with the power supply command, the charger 3 converts the power supplied from external AC power source 100, to DC power, and supplies the converted power to battery 4, PTC heater 5 and compressor 6. The charger 3 may be an in-vehicle device installed in the vehicle, or may be an external device provided outside the vehicle. Furthermore, the charger 3 obtains information on an available supply power $P_{MAX}$ of external AC power source 100 by communication with external AC power source 100, and sends the information on the available supply power $P_{MAX}$ to system control unit 10.

The system control unit 10 is a device for controlling the battery control system 1 by performing communication with battery controller 8, air conditioning control amplifier 9 and charger 3. In accordance with the request charging power Pbat and allowable charging power $P_{lim}$ sent from battery controller 8, the request driving power Pac sent from air conditioning control amplifier 9 and the available supply power $P_{max}$ of external AC power source 100 sent from charger 3, the system control unit 10 sets a power, as a supply power Psup, to be supplied from external AC power source 100 to battery 4 and the PTC heater 5 and compressor 6 constituting the air conditioner, and delivers the power supply command including the set supply power $P_{sup}$, to charger 3. In accordance with the power supply command from system control unit 10, the charger 3 supplies power to the battery 4, PTC heater 5 and compressor 6, according to the supply power Psup.

Moreover, when the request driving power $P_{ac}$ is received from air conditioning control amplifier 9, the system control unit 10 calculates a power used for driving PTC heater 5 and compressor 6, as a permissible power $P_{per}$, and sends the calculated permissable power Pper to the air conditioning control amplifier 9. Air conditioning control amplifier 9 drives and controls the PTC heater 5 and compressor 6 by using the supply power $P_{sup}$ supplied from external AC power source 100 within the range of permissible power $P_{per}$. The permissible power $P_{per}$ is determined from the request driving power $P_{ac}$, in dependence on the mode of charging battery 4 from external AC power source 100 by checking whether the system control unit 10 is set to a first mode (air condition priority mode) to give priority to the drive of the air conditioner over the charge of battery 4 or to a second mode (charge priority mode) to give priority to the charge of battery 4 over the drive of the air conditioner. For example, in the case of the air condition priority mode, the system control unit 10 can set the permissible power $P_{per}$ at the request driving power $P_{ac}$ ($P_{PER}=P_{AC}$), and thereby drives the air conditioner preferentially.

The system control unit 10 may be an in-vehicle unit installed in the vehicle, or may be an external unit provided outside the vehicle.

Figure 3:
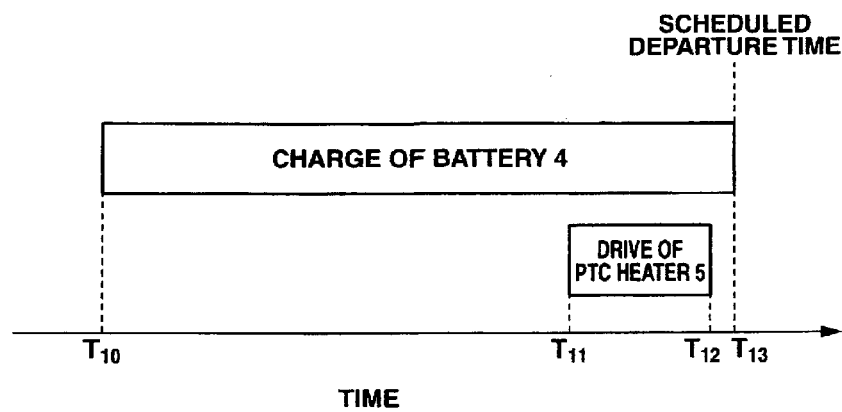
FIG. 3 shows, as an example, a situation to which the battery charging system according to the embodiment can be applied.
Figure 4:
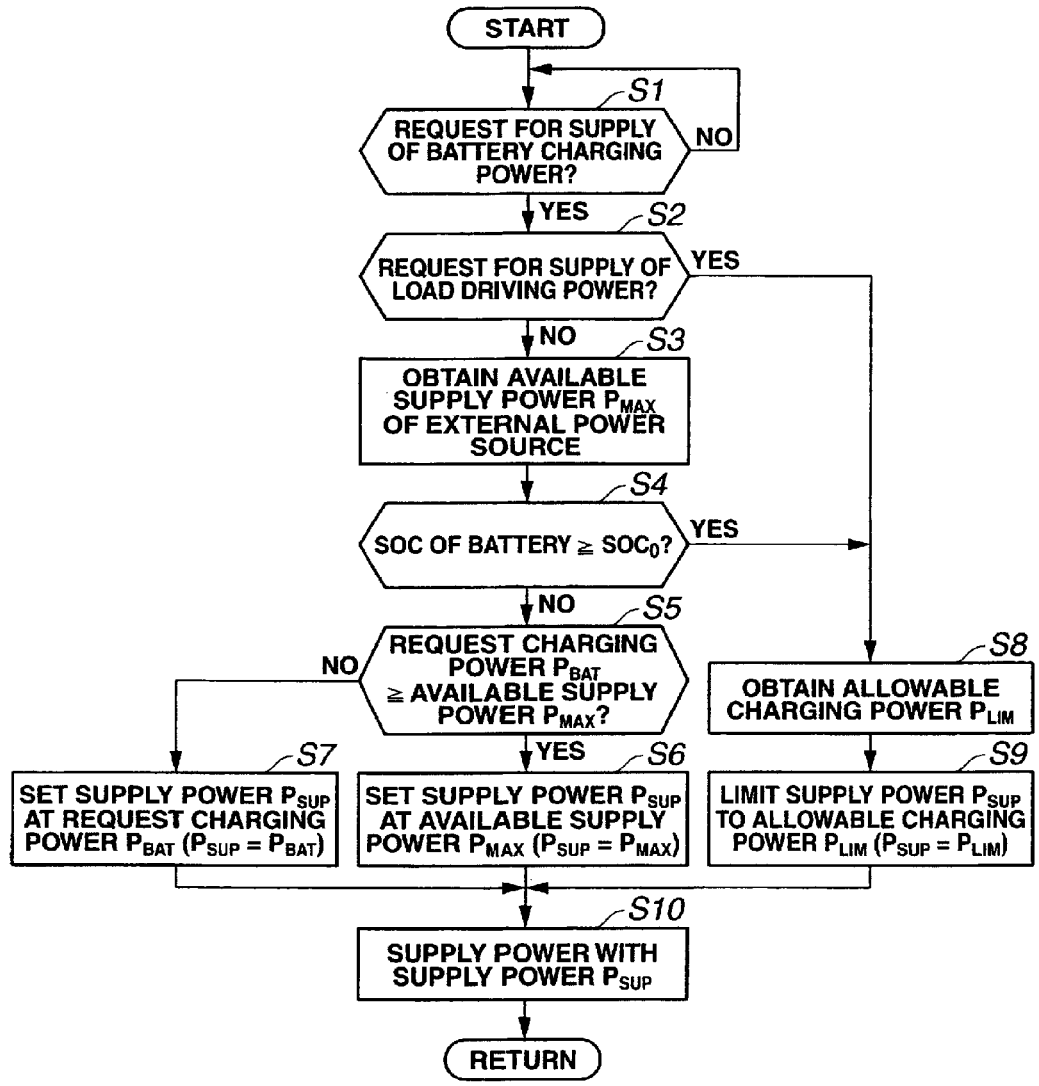
FIG. 4 is a flowchart showing, as an example, a battery charging process according to the embodiment.

FIG. 4 shows a battery charging process according to the embodiment, applied to a situation shown in FIG. 3.

FIG. 3 shows, as an example, the situation to charge battery 4 to a fully charged state and to set the temperature in the compartment of the vehicle to a target temperature by a time $T_{13}$ which is a scheduled departure time (or instant). In the example of FIG. 3, the system starts a charging operation of charging battery 4 with power from external AC power source 100, at a time $T_{10}$. After continuation of the charging operation to a charged state near the fully charged state, the system starts a driving operation of driving PTC heater 5 at a time $T_{11}$ while continuing the charging operation for battery 4. Then, the system stops the driving operation of driving PTC heater 5 at a time $T_{12}$ when the inside temperature in the compartment is raised to the target temperature. Thereafter, the system continues the charging operation until the scheduled departure time $T_{13}$, and thereby brings battery 4 to the fully-charged state.

In the example of FIG. 3, the battery 4 is already charged to a nearly full state near the fully charged state, at $T_{11}$ which is the instant to start the heater driving operation. Therefore, at $T_{11}$, the SOC of battery 4 is higher than a predetermined SOC value $SOC_0$ (as mentioned later).

The battery charging process shown in FIG. 4 is performed by system control unit 10 shown in FIG. 1.

First, at a step S1, system control unit 10 determines whether a charging power supply request for the supply of charging power to battery 4 is generated by battery controller 8, or not. From S1, system control unit 10 proceeds to a step S2 in the case of judgment that the charging power supply request is generated, and repeats step S1 in the case of judgment that the charging power supply request is not generated. System control unit 10 can determine whether the charging power supply request is generated or not, by examining whether the request charging power $P_{bat}$ is sent from battery controller 8, or not.

At step S2, system control unit 10 determines whether a driving power supply request for the supply of driving power to PTC heater 5 is generated by air conditioning amplifier 9 or not. System control unit 10 proceeds to a step S3 in the case of judgment that the driving power supply request is not generated, and to a step S8 in the case of judgment that the driving power supply request is generated. System control unit 10 can determine whether the driving power supply request is generated or not, by examining whether the request driving power $P_{ac}$, is sent from air conditioning control amplifier 9 or not.

At step S3, system control unit 10 obtains the available supply power $P_{max}$ of external AC power source 100, from charger 3.

At a step S4 following S3, system control unit 10 obtains the SOC of battery 4 calculated by battery controller 8, and examines whether the SOC of battery 4 is greater than or equal to the predetermined value $SOC_0$. From S4, system control unit 10 proceeds to a step S5 in the case of judgment that the SOC of battery 4 is smaller than the predetermined value $SOC_0$, and to the step S8 in the case of judgment that the SOC of battery 4 is greater than or equal to the predetermined value $SOC_0$. In this example, the predetermined value $SOC_0$ is a value to judge that the state of battery 4 is near the fully-charged state.

At step S5, system control unit 10 examines whether the request charging power $P_{bat}$ obtained at S1 is greater than or equal to the available supply power $P_{max}$ obtained at S3. From S5, system control unit 10 proceeds to a step S6 in the case of judgment that the request charging power $P_{bat}$ is greater than or equal to the available supply power $P_{max}$, and to a step S7 in the case of judgment that the request charging power $P_{bat}$ is smaller than the available supply power $P_{max}$.

At step S6, system control unit 10 sets the supply power $P_{sup}$ from external AC power source 100, equal to the available supply power $P_{max}$ of external AC power source 100 ($P_{sup}=P_{max}$) in accord with the judgment that the request charging power $P_{bat}$ is greater than or equal to the available supply power $P_{max}$.

At step S7, on the other hand, the system control unit 10 sets the supply power $P_{sup}$ from external AC power source 100 equal to the request charging power $P_{bat}$ from battery controller 8 ($P_{sup}=P_{bat}$) in accord with the judgment that the request charging power $P_{bat}$ is smaller than the available supply power $P_{max}$.

Step S8 is reached when the judgment at S2 is that the driving power supply request to supply the driving power to PTC heater 5 is generated by air conditioning control amplifier 9 or when the judgment at S4 is that the SOC of battery 4 is greater than or equal to the predetermined value $SOC_0$. At S8, system control unit 10 obtains the allowable charging power $P_{lim}$ of battery 4 calculated by battery controller 8. This allowable charging power $P_{lim}$ is a charging power which the battery 4 can allow, and which is calculated periodically by battery controller 8 from the SOC of battery 4, and the internal resistance of battery 4.

At step S9, system control unit 10 sets the supply power $P_{SUP}$ for supply from external AC power source 100 to battery 4, equal to the allowable charging power $P_{LIM}$ obtained at S8 ($P_{SUP}=P_{LIM}$). When the judgment at step S4 of this example is that the SOC of battery 4 is higher than or equal to predetermined value $SOC_0$, the battery 4 is in the near full state near the fully-charged state. Therefore, the total voltage of battery 4 might be increased beyond the above-mentioned upper limit charging voltage $V_{U\text{-}LIM}$ if battery 4 is charged with greater power. Consequently, the system control unit 10 limits the supply power $P_{SUP}$ for the supply from external AC power source 100 to battery 4, to the allowable charging power $P_{LIM}$ which is allowable to battery 4. Thus, the system of this example can effectively prevent the total voltage of battery 4 from exceeding the upper limit charging voltage $V_{U\text{-}LIM}$ by limiting the supply power $P_{SUP}$ to the allowable charge power $P_{LIM}$.

In the situation of FIG. 3, when PTC heater 5 is driven in response to the request for the supply of driving power (the answer of S2 is YES), the battery 4 is in the near full state near the fully-charged state, and hence the SOC of battery 4 is greater than predetermined value $SOC_0$. Therefore, the system of this example limits the supply power $P_{sup}$ for the supply from external AC power source 100 to battery 4, to the allowable charging power $P_{lim}$ even when the driving power supply request is generated for the supply of power to PTC heater 5 (the answer of S2 is YES).

At a step S10, system control unit 10 supplies power corresponding to the supply power $P_{sup}$ determined at S6, S7 or S9, to charger 3. Thus, power in the amount of the supply power Psup is supplied from external AC power source 100. When there is no request for the supply of the driving power from air conditioning control amplifier 9 at S2, the system of this example supplies the supply power Psup from external AC power source 100, to battery 4, and thereby charges battery 4.

When, on the other hand, it is concluded at S2 that the driving power supply request is generated by air conditioning control amplifier 9, the supply power $P_{sup}$ is supplied from external AC power source 100, to PTC heater 5 as well as to battery 4. In this case, system control unit 10 calculates the permissible power $P_{per}$ and sends the permissible power $P_{per}$ to air conditioning control amplifier 9. Accordingly, the PTC heater 5 is driven within the range of the permissible power Pper, and battery 4 is charged by the remaining power of the supply power $P_{sup}$ from external AC power source 100.

After S10, system control unit 10 returns to S1, and repeats the process of S1~S10.

Figure 5:
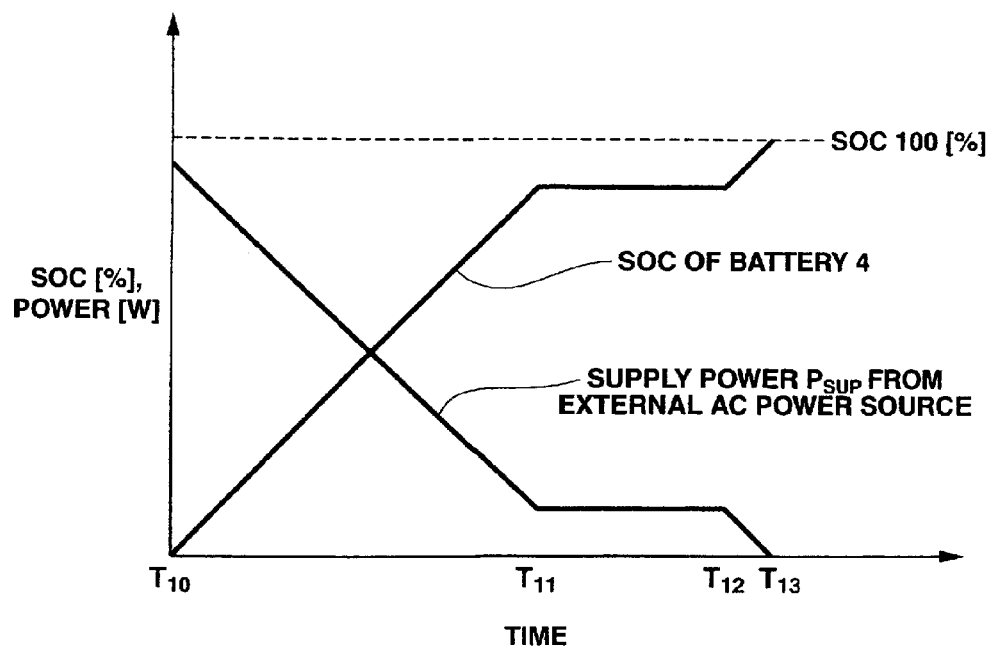
FIG. 5 is a graph showing a relation between the SOC of the battery and a supply power $P_{SUP}$ from an external AC power source 100 in the situation of FIG. 3.

FIG. 5 illustrates operations of the battery charging system 1 for charging battery 4 and driving PTC heater 5 according to the battery charging process of FIG. 4 in the situation of FIG. 3. FIG. 5 is a graphic view showing a relationship between the SOC of battery 4 and the supply power $P_{SUP}$ from external AC power source 100 in the situation of FIG. 3. The following explanation is directed to an example in which the charging mode for charging battery 4 from external AC power source 100 is set to the mode (air conditioning priority mode) of giving priority to the driving operation of the air conditioner over the charging operation of battery 4.

In the example of FIG. 3, the request charging power Pbat is sent from battery controller 8 to system control unit 10 at time $T_{10}$, and the system control unit 10 supplies the supply power $P_{sup}$ from external AC power source 100 to battery 4 by repeating steps S1~S7 and S10, and thereby performs the charging operation of charging battery 4. As shown in FIG. 5, the SOC of battery 4 increases as the charging operation of battery 4 proceeds. The allowable charging power $P_{lim}$ of battery 4 decreases with increase of the SOC of battery 4. In this case, the supply power Psup from external AC power source 100 is set to the available supply power $P_{max}$ (in the case of S6), or to the request charging power $P_{bat}$ (in the case of S7).

When the SOC of battery 4 becomes equal to or higher than the predetermined value $SOC_0$ (the answer of S4 is YES), the supply power $P_{SUP}$ is set to the allowable charging power $P_{LIM}$ (at S9). The system control unit 10 performs the charging operation of charging battery 4 with allowable charging power $P_{LIM}$ by repeating steps S1~S4 and S8~S10. A time $T_A$ is an instant when the SOC of battery 4 becomes equal to or greater than predetermined value $SOC_0$.

From the time $T_A$ when the SOC of battery 4 becomes equal to or greater than predetermined value $SOC_0$, to the time $T_{11}$, the charging operation of battery 4 is performed with the allowable charging power $P_{LIM}$. At time $T_{11}$, the request driving power $P_{AC}$ is sent from air conditioning control amplifier 9 to system control unit 10. In this case, system control unit 10 judges at S2 that the driving power supply request is generated for the supply of driving power to PTC heater 5, and sets the supply power $P_{SUP}$ from external AC power source 100 to the allowable charging power $P_{LIM}$ at S9. In other words, the system control unit 10 holds the supply power $P_{SUP}$ from external AC power source 100 at allowable charging power $P_{LIM}$ at S9 even when the driving power supply request is generated (YES of S2). During the period from $T_{11}$~$T_{12}$, the system performs the charging operation of battery 4 and the driving operation of PTC heater 5 with the allowable charging power $P_{LIM}$.

Then, at time $T_{12}$ after the inside temperature in the compartment of the vehicle has reached the target temperature, the system stops the driving operation of PTC heater 5. Thereafter, until time $T_{13}$ at which the vehicle is scheduled to depart, the system continues the charging operation of battery 4 with the allowable charging power $P_{LIM}$ by repeating steps S1~S4 and S8~S10, and thereby charges the battery 4 to the fully-charged state.

Figure 6:
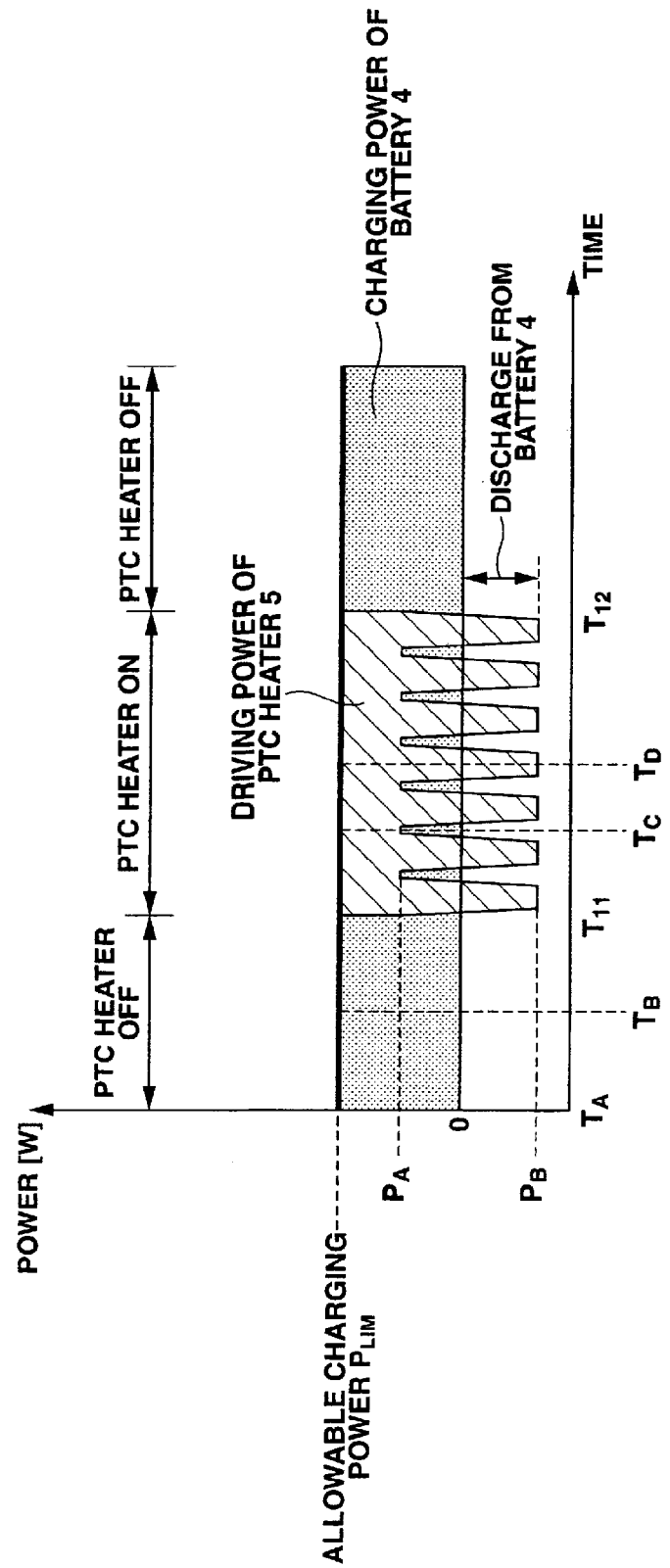
FIG. 6 is a view showing a relation between charging power supplied to the battery 4 and driving power supplied to PTC heater 5 in the situation of FIG. 3 (air condition priority mode).

FIG. 6 shows a relation between the charging power supplied to battery 4 and the driving power supplied to PTC heater 5 during the period from $T_A$ to $T_{12}$. In FIG. 6, the charging power supplied to battery 4 and the driving power supplied to PTC heater 5 are shown in a pile. At a time $T_B$, for example, the charging power supplied from external AC power source 100 to battery 4 is equal to $P_{LIM}$. At a time $T_C$, the charging power supplied from external AC power source 100 to battery 4 is $P_A$, and the driving power supplied from external AC power source 100 to PTC heater 5 is $P_{LIM}$-$P_A$. At a time $T_D$, the driving power is supplied to PTC heater 5 from external AC power source 100 and battery 4, and the driving power is equal to $P_{LIM}$+|$P_B$|. That is, the battery 4 is in a discharging state at time $T_D$. Moreover, in the example of FIG. 6, the battery charging mode for charging battery 4 from external AC power source 100 is set at the air condition priority mode. Therefore, the permissible power $P_{PER}$ for driving PTC heater 5 is set at the request driving power $P_{AC}$.

As shown in FIG. 6, during the period of $T_A$~$T_{11}$ (PTC heater OFF period), the supply power $P_{SUP}$ from external AC power source 100 is set to the allowable charging power $P_{LIM}$, and the supply power $P_{SUP}$ is supplied to battery 4 from external AC power source 100 to charge battery 4.

In this embodiment, even during the (PTC heater ON) period from $T_{11}$ to $T_{12}$, following the (PTC heater OFF) period from $T_A$ to $T_{11}$, the battery charging system 1 continues the setting of supply power PSUP supplied from external AC power source 100 to the allowable charging power $P_{LIM}$, without changing the setting during the (PTC heater OFF) period from $T_A$ to $T_{11}$, and supplies the supply power $P_{SUP}$ from external AC power source 100, to battery 4 and PTC heater 5. Since the PTC heater 5 according to this embodiment includes the pulse-driven first heater controlled in the PWM control mode and the constant-driven second heater driven by constant power, the driving power for driving PTC heater 5 is varied periodically during the (PTC heater ON) period from $T_{11}$ to $T_{12}$, as shown in FIG. 6. With this periodical variation, the charging power for battery 4 is varied, and the battery 4 is discharged at peaks where the driving power of PTC heater 5 is increased to the greatest level.

During this (PTC heater ON) period from $T_{11}$ to $T_{12}$ (the period during which S2 is YES), the setting of the supply power $P_{SUP}$ from external AC power source 100 to the allowable charging power $P_{LIM}$ (PSUP=$P_{LIM}$)(at S9) is held unchanged from the (PTC heater OFF) period from $T_A$ to $T_{11}$ (the period during which S4 is YES). Therefore, the battery charging system 1 according to this embodiment can hold the charging power of battery 4 at or under the allowable charging power $P_{LIM}$ even during the (PTC heater ON) period from T11 to T12, hence prevent the total voltage of battery 4 from exceeding the upper limit charging voltage $V_{U-LIM}$ effectively, and thereby prevent deterioration of battery 4. In FIG. 6, the pulse waveform for PTC heater 5 is shown in a simplified form for simplify the explanation. The present invention is not limited to the example of FIG. 6, in the pulse waveform, duty ratio and frequency.

Figure 7:
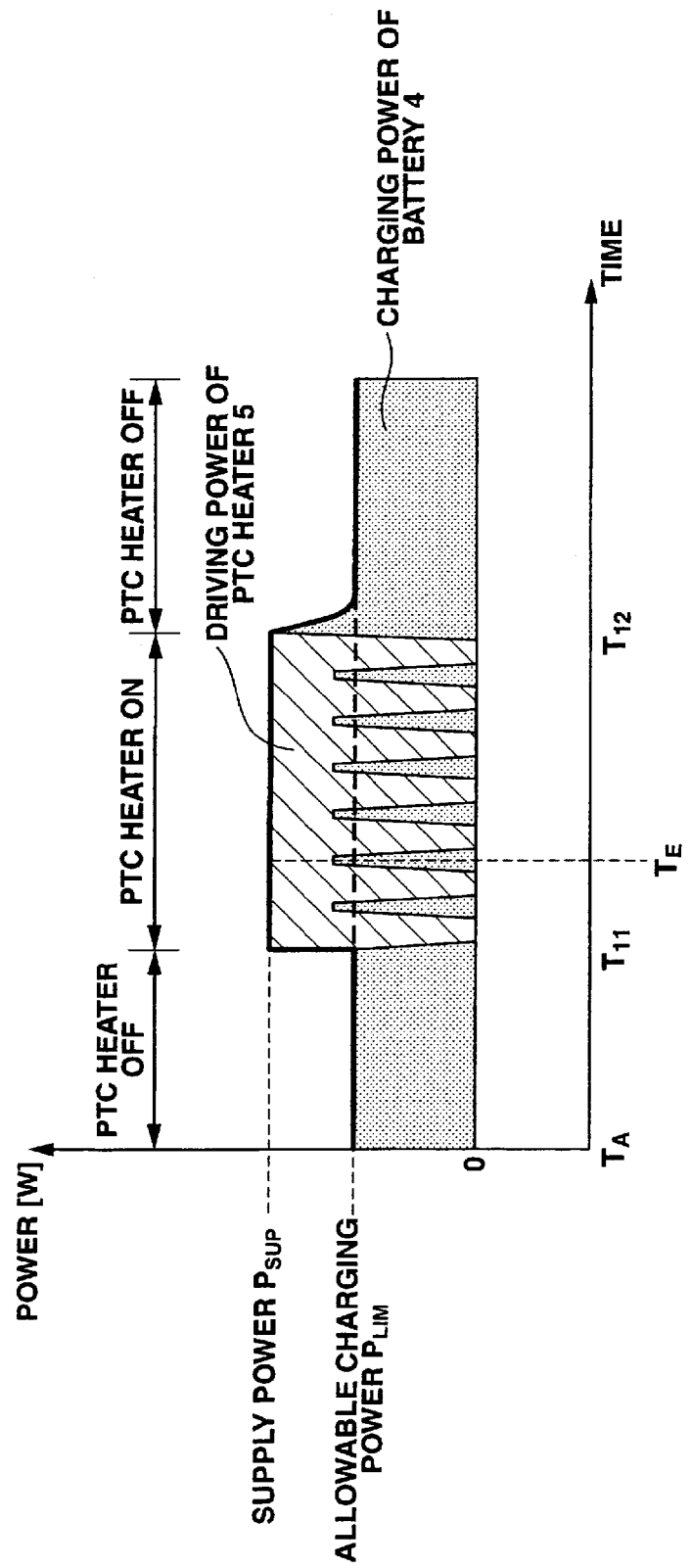
FIG. 7 is a view showing a relation between charging power supplied to the battery 4 and driving power supplied to PTC heater 5 in a comparative example.

When, by contrast to the embodiment, the supply power $P_{SUP}$ from external AC power source 100 is increased in accordance with the request driving power PAC for driving PTC heater 5 at the time of turn-on of PTC heater 5, as in a comparative example shown in FIG. 7, the charging power supplied to battery 4 is increased beyond the allowable charging power $P_{LIM}$ of battery 4 at the timing (at a time $T_E$, for example) at which the driving power for PTC heater 5 becomes minimum. As a result, the total voltage of battery 4 exceeds the upper limit charging voltage $V_{U-LIM}$ and battery 4 is deteriorated.

Moreover, when the PTC heater is turned off at the time $T_{12}$ in the comparative example of FIG. 7, the power to be supplied to PTC heater 5 is supplied to battery 4, and therefore the supply power to battery 4 exceeds the allowable charging power $P_{LIM}$. Consequently, the total voltage of battery 4 exceeds the upper limit charging voltage $V_{U-LIM}$ and battery 4 is deteriorated, in this case, too.

By contrast to the comparative example of FIG. 7, the battery charging system 1 according to this embodiment can solve these problems by continue setting the supply power $P_{SUP}$ from external AC power source 100 at the allowable charging power $P_{LIM}$ during the (PTC heater ON) period from T11 to $T_{12}$, as well as the (PTC heater OFF) period from $T_A$ to $T_{11}$.

As shown in FIG. 6, during the (PTC heater ON) period from $T_{11}$ to $T_{12}$, the battery 4 is discharged at the intervals where the driving power of PTC heater 5 is maximum (at the time $T_D$, for example), so that the SOC may be decreased. The possibility of decrease of the SOC is higher especially when the battery charging mode for charging battery 4 from external AC power source 100 is set to the air condition priority mode. However, because the allowable charging power $P_{LIM}$ is increased with decrease of the SOC, as mentioned before, the battery controller 8 increases the allowable charging power $P_{LIM}$ when the SOC decreases. Therefore, the battery charging system 1 of this embodiment can maintain the SOC of battery 4 by increasing the allowable charging power $P_{LIM}$ with decrease of the SOC and thereby increasing the supply power $P_{SUP}$ from external AC power source 100. Consequently, the SOC is held substantially constant or not decreased during the (PTC heater ON) period from $T_{11}$ to $T_{12}$, as shown in FIG. 5. FIG. 5 shows that the SOC and the supply power $P_{SUP}$ from external AC power source 100 are held constant during the (PTC heater ON) period from $T_{11}$ to $T_{12}$. In practice, however, each of the SOC and the supply power $P_{SUP}$ is varied upward and downward periodically by repetition of decrease of SOC→increase of allowable charging power $P_{LIM}$ (and supply power $P_{SUP}$)→increase of SOC→decrease of allowable charging power $P_{LIM}$ (and supply power $P_{SUP}$)→decrease of SOC . . . .

As mentioned before, the battery charging system 1 according to this embodiment performs the charging operation of battery 4 and the driving operation of PTC heater 5 by continuing the limitation of the supply power $P_{SUP}$ to the allowable charging power $P_{LIM}$ when the driving request for driving the pulse-driven PTC heater 5 is generated in the state in which battery 4 is charged with the supply power $P_{SUP}$ limited to allowable charging power $P_{LIM}$. Therefore, the battery charging system can drive PTC heater 5 while holding the charging power of battery 4 in the state not exceeding allowable charging power $P_{LIM}$ as shown in FIG. 6, by continuing the limitation of supply power $P_{SUP}$ to allowable charging power $P_{LIM}$. Thus, the system can properly perform the charging operation of battery 4 and the driving operation of PTC heater 5, effectively prevent the total voltage of battery 4 from exceeding the upper limit charging voltage $V_{U-LIM}$, and thereby prevent deterioration of battery 4.

In addition, by continuing the limitation of limiting the supply power $P_{SUP}$ from external AC power source 100, to allowable charging power $P_{LIM}$ at the time of driving a heavy electric ancillary device such as PTC heater 5, the battery charging system 1 according to this embodiment can prevent the power supplied to battery 4 from exceeding allowable charging power $P_{LIM}$ effectively even if the power used for driving the ancillary device such as PTC heater 5 is supplied to battery 4 when the ancillary device is turned off. Moreover, even if the power supply to the load is shut off because of a failure of the pulse-driven ancillary device such as PTC heater 5, or for other reasons, the battery charging system 1 according to this embodiment can prevent the power supplied to battery 4 from exceeding allowable charging power $P_{LIM}$ similarly.

In the illustrated embodiment: the heavy electric line 2 corresponds to an electric line adapted to make electrical connection with an external power source; the battery 4 corresponds to a battery or an in-vehicle battery connected electrically with the electric line and arranged to be charged with power supplied through the electric line; the PTC heater 5 can serve as a load, the battery controller 8 can serve as a calculating section of calculating an allowable battery power allowable by the battery, and a battery power requesting section; the air conditioning control amplifier 9 can serve as a load power requesting section; and the system control unit 10 can serve as a controlling section for controlling the supply power from the external power source to the battery and load.

Although the invention has been described above by reference to certain embodiment(s) of the invention, the invention is not limited to the embodiment(s) described above. Each of elements disclosed in the embodiment(s) includes all modifications, design changes and equivalents within the technical range of the present invention.

Figure 8:
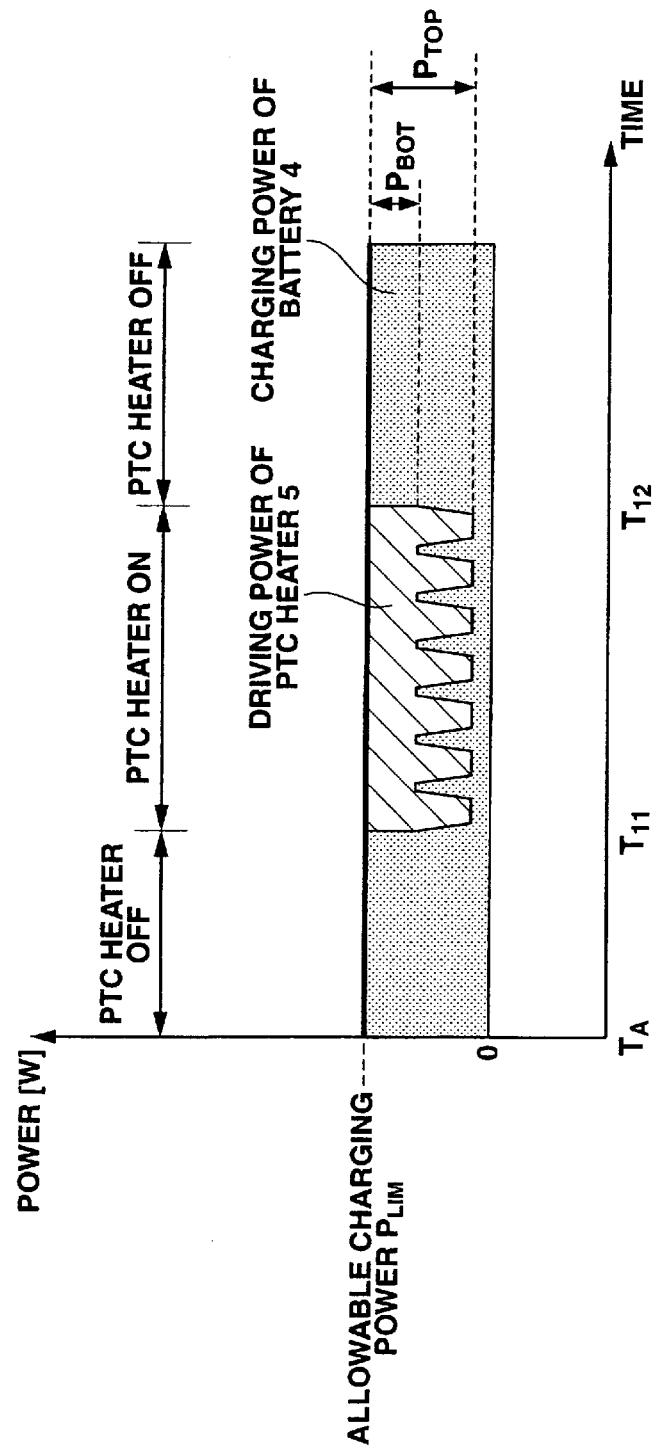
FIG. 8 is a view showing a relation between charging power supplied to the battery 4 and driving power supplied to PTC heater 5 in the situation of FIG. 3 (charge priority mode).

In the example of FIG. 6, the battery charging mode is set to the mode (air conditioning priority mode) for giving priority to the driving operation of PTC heater 5 over the charging operation of battery 4, and accordingly, the permissible power $P_{PER}$ for driving PTC heater 5 is set at the request driving power PAC. However, in the case of the battery charging mode being set to the mode (charging priority mode) for giving priority to the charging operation of battery 4 over the driving operation of PTC heater 5, it is possible to set the permissible power $P_{PER}$ equal to such a value that a maximum value $P_{TOP}$ of the supply power at the time of pulse-driving of PTC heater 5 is lower than the allowable charging power $P_{LIM}$, as shown in FIG. 8. By setting the permissible power $P_{PER}$ for driving PTC heater 5 in this way, the battery charging system can perform the charging operation of battery 4 in priority to the driving operation of PTC heater 5, and thereby reduce the charging time of battery 4.

The present invention is not limited to the situation shown, as an example, in FIG. 3. The battery charging process according to the present invention is applicable to various other situations such as a situation shown in FIG. 9, as well as the situation of FIG. 3. In the situation shown, as an example, in FIG. 9, the system starts a charging operation of battery 4 at an time $T_{20}$, with power from external AC power source 100, terminates the charging operation of battery 4 because battery 4 is fully charged, starts a driving operation of PTC heater 5 at a time $T_{22}$ earlier than a scheduled departure time $T_{23}$ by a predetermined time length, and continues the driving operation of PTC heater 5 until the scheduled departure time $T_{23}$.

Figure 9:
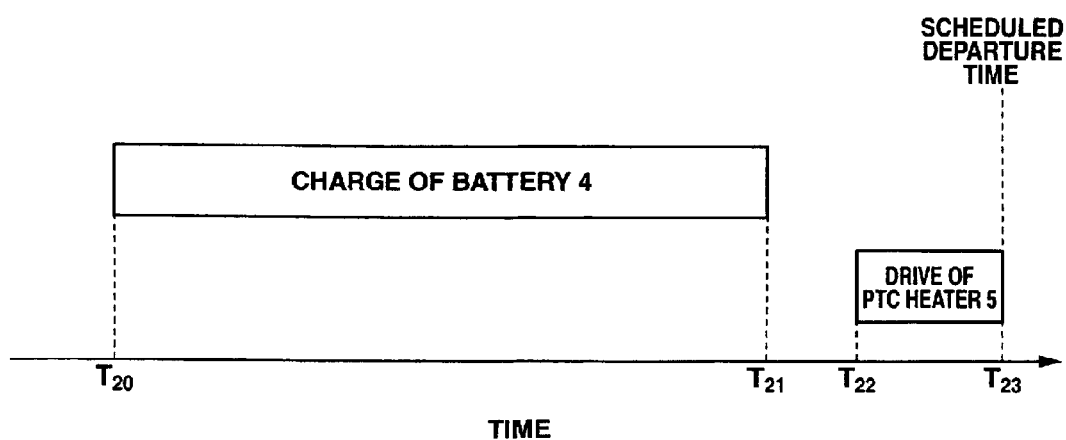
FIG. 9 shows, as an example, another situation to which the battery charging system according to the embodiment can be applied.
Figure 10:
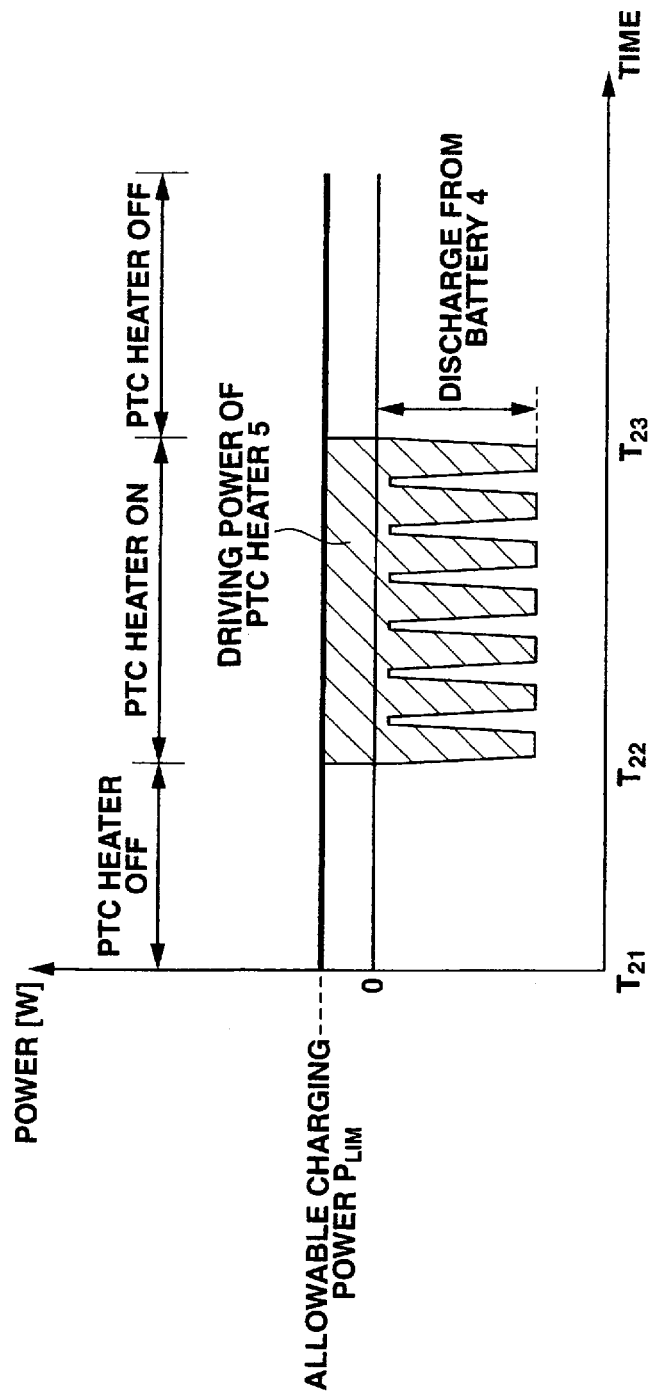
FIG. 10 is a view showing a relation between charging power supplied to the battery 4 and driving power supplied to PTC heater 5 in the situation of FIG. 9 (air condition priority mode).
Figure 11:
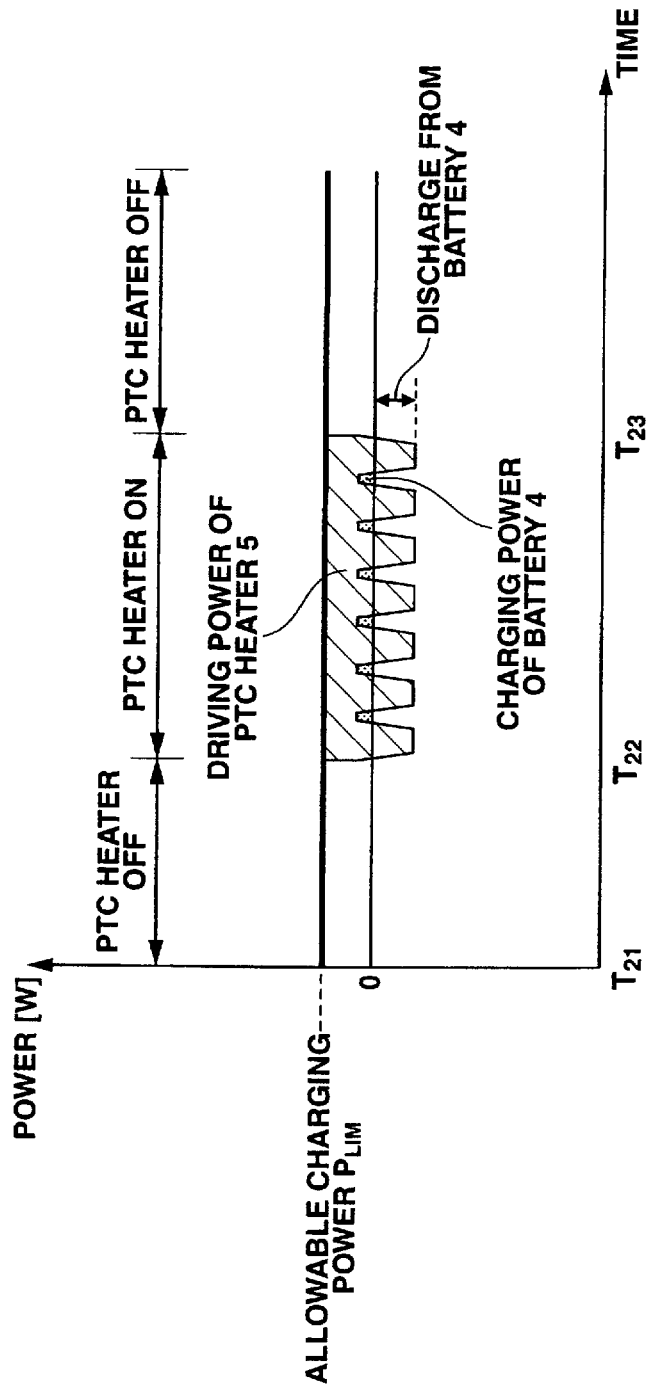
FIG. 11 is a view showing a relation between charging power supplied to the battery 4 and driving power supplied to PTC heater 5 in the situation of FIG. 9 (charge priority mode).

In the situation of FIG. 9, the charging operation of battery 4 is not performed after $T_{21}$. In this case, too, as in the situation shown in FIG. 3, the battery charging system 1 performs the driving operation of PCT heater 5 during a period (PTC heater ON period) from $T_{22}$ to $T_{23}$ by setting the supply power PSUP from external AC power source 100, to allowable charging power $P_{LIM}$ (continuing the limitation of limiting the supply power PSUP to allowable charging power $P_{LIM}$), as shown in FIGS. 10 and 11. FIG. 10 is a view showing a relation between the charging power supplied to battery 4 and the driving power supplied to PTC heater 5 in the air conditioning priority mode. FIG. 11 is a view showing a relation between the charging power supplied to battery 4 and the driving power supplied to PTC heater 5 in the charging priority mode. In the cases of FIG. 10 and FIG. 11, the allowable charging power $P_{LIM}$ is smaller as compared with the level shown in FIG. 6 because the state of battery 4 is closer to the fully-charged state as compare to the example of FIG. 6.

In the example of the flowchart shown in FIG. 4, the supply power PSUP from external AC power source 100 is held equal to allowable charging power $P_{LIM}$ in the driving operation of PTC heater 5. However, it is possible to use a predetermined power PCULC (limit power) calculated in a following manner, in place of allowable charging power $P_{LIM}$, for limiting the supply power $P_{SUP}$ from external AC power source 100. The power $P_{CULC}$ is calculated in the following manner by system control unit 10.

First, system control unit 10 receives information on the request driving power $P_{AC}$ for driving PTC heater 5, from air conditioning control amplifier 9, and calculates a smallest value $P_{BOT}$ (shown in FIG. 8) of the consumed power of PTC heater 5 during the pule driving operation when PTC heater 5 is driven. The thus-calculated smallest value PBOT is set as a minimum driving power $P_{MIN}$.

Then, system control unit 10 obtains the available supply power $P_{MAX}$ from charger 3, and the request charging power $P_{BAT}$ from battery controller 8, and calculates a surplus power $P_{RES}$ by determining a difference between $P_{MAX}$ and $P_{BAT}$.

Then, system control unit 10 calculates a target driving power $P_{TAR}$ which is power within the range of the surplus power $P_{RES}$, and which is smaller than or equal to the minimum driving power $P_{MIN}$ determined from the request driving power $P_{AC}$ as mentioned above. Then, system control unit 10 determines the predetermined power $P_{CULC}$ by adding the target driving power PTAR and the allowable charging power $P_{LIM}$ together.

By setting the supply power from external AC power source 100 during the driving operation of PTC heater 5 (in association with the charging operation of battery 4), to the thus-calculated power $P_{CULC}$, the battery charging system can restrain the charging power to battery 4 from being reduced by the driving operation of PTC heater 5, and continue the condition for preventing the charging power of battery 4 from exceeding the allowable charging power $P_{LIM}$.

In the illustrated example, the load is in the form of PTC heater 5. However, the load is not limited to PTC heater 5. The load may be a pulse-driven other ancillary device or a load of other type. In the case of a load other than the pulse-driven load, too, the battery charging system can prevent the power supplied to battery 4 from exceeding the allowable charging power PLIM by continuing the limitation of limiting the supply power PSUP from external AC power source 100 to the allowable charging power $P_{LIM}$ (or the calculated power $P_{CULC}$), as in the illustrated example, when, for example, the power supply to the load is shut off by a failure of the load, and the power used for driving the load is supplied to battery 4.

As explained above, a battery charging system (1) according to the illustrated embodiment comprises: an electric line, a battery, a load, a battery power requesting section, a load power requesting section, and a controlling section. The electric line is a line adapted to make electrical connection with an external power source. In the illustrated embodiment, the electric line is a heavy electric line (2) for supplying power to the battery and the load. The battery (4) such as an in-vehicle battery adapted to be installed in a vehicle, is connected electrically with the electric line and arranged to be charged with power supplied through the electric line. The load such as an ancillary device is connected electrically with the electric line and arranged to receive the power supplied through the electric line. The load may be a pulse-driven device, such as the PTC heater 5.

The battery power requesting section is configured to request supply of charging power to the battery. The battery power requesting section (8) may be configured to produce a battery power supply request ($P_{BAT}$). The load power requesting section is configured to request supply of driving power to the load. The load power requesting section (9) may be configured to produce a load power supply request ($P_{AC}$). The controlling section is a section (10) to control supply power to be supplied from the external power source to the battery and the load, in accordance with a request charging power ($P_{BAT}$) from the battery power requesting section and a request load power ($P_{AC}$) from the load power requesting section.

The controlling section is configured to impose limitation of limiting the supply power ($P_{SUP}$) from the external power source (100), to a limitation power ($P_{LIM}$) in a load OFF state in which the load is OFF and the supply power from the external power source is not supplied to the load. The controlling section is further configured to continue the limitation of limiting the supply power from the external power source (100), to the limitation power ($P_{LIM}$, $P_{CULC}$) when the load is turned from the OFF state to an ON state to supply the supply power to the battery and load.

In the illustrated example, the controlling section (10) may be configured to supply the request load power ($P_{AC}$) to the load in the case of a mode of giving priority to the power supply to the load (for example, by setting a permissible load power ($P_{PER}$) at the request load power ($P_{PER}=P_{AC}$). In the battery charging system, the controlling section may be configured to control the supply power to the load so as to prevent the supply power to the load from exceeding the allowable battery power ($P_{LIM}$), in the case of a mode of giving priority to a charging operation of charging the battery (for example, by setting the permissible load power ($P_{PER}$) at a value to prevent the supply power to the load from exceeding the allowable batter power ($P_{LIM}$)).

According to the illustrated embodiment, as explained above, a battery charging process of charging a battery (4) and driving a load (5), with power supplied from an external power source (through an electric line 2), comprises: a first step or limiting step (S9, S8) of imposing limitation for limiting power supplied from the external power source to the battery to an allowable battery power ($P_{LIM}$), and a second step or continuing (or examining) step (S2) of examining whether a load power request for supply driving power to the load is generated, and continuing the limitation when the load power request is generated.

The battery charging process according to the illustrated embodiment may further comprise a third step (S4) of examining whether a SOC of the battery is higher than or equal to a predetermined level ($SOC_0$), and causing the first step (S9) to impose limitation for limiting the power supplied from the external power source to the battery to the allowable battery power ($P_{LIM}$).

The battery charging process according to the illustrated embodiment may further comprises a distributing step (S10) in addition to the first and second steps or in addition to the first, second and third steps. The distributing step is a step of distributing the supply power from the external power source between the battery and the load in the state holding limitation of limiting the supply power from the external power source to the allowable battery power when a request for the supply of power to the load is generated. In the distributing step, power is supplied to the load in the range of a permissible load power ($P_{PER}$) which is lower than or equal to the request load power ($P_{AC}$).

According to a variation of the illustrated embodiment, a battery charging process of charging a battery (4) and driving a load (5), with power supplied from an external power source (through an electric line 2), comprises a first step of calculating, as a minimum driving power, a minimum value ($P_{BOT}$) of the supply power to the load (5) in a driving operation of driving the load in accordance with a request load power in response to a request for the supply of power to the load, a second step of calculating, as a target load driving power, a power which is within a range of surplus power determined by a difference between an available supply power that the external power source can supply and a power supplied to the in-vehicle battery, and which is lower than or equal to the minimum driving power, a third step of setting, as a limit power, a sum of the target driving power ($P_{TAR}$) and the allowable battery power, and a fourth step of distributing the supply power ($P_{SUP}$) from the external power source (100) between the battery (4) and the load (5) within a range of limitation of limiting the supply power ($P_{SUP}$) from the external power source (100) to the limit power ($P_{CULC}$).

The battery charging system 1 according to the present invention can limit, to the allowable battery power, the sum of the charging power supplied to the battery and the driving power supplied to the load, in a combined operation of supplying power to the battery and simultaneously supplying power to the load. Therefore, the battery charging system according to the present invention can perform the combined operation of supplying power to the battery and simultaneously supplying power to the load adequately, and prevent the voltage of the battery from exceeding an upper limit voltage effectively.

The present invention is based on a prior Japanese Patent Application No. 2010-131978 filed on Jun. 9, 2010, and a prior Japanese Patent Applications No. 2011-091896 filed on Apr. 18, 2011. The entire contents of these Japanese patent applications are hereby incorporated by reference.

The invention claimed is:

1. A battery charging system, comprising:
a heavy electric line adapted to make electrical connection with an external power source;
an in-vehicle battery connected electrically with the heavy electric line and arranged to be charged with power supplied through the heavy electric line;
a load connected electrically with the heavy electric line and arranged to receive power supplied through the heavy electric line;
a calculating section configured to calculate a charging power allowable by the battery, as an allowable battery power;
a battery power requesting section configured to request supply of charging power to the battery;
a load power requesting section configured to request supply of power to the load; and
a controlling section configured to control supply power to be supplied from the external power source to the battery and the load, in accordance with a request charging power from the battery power requesting section and a request load power from the load power requesting section,
the controlling section being configured:
to limit power supplied from the external power source to the battery to the allowable battery power, and
to distribute the supply power from the external power source between the battery and the load in a state holding limitation of limiting the supply power from the external power source to the battery to the allowable battery power when a request for the supply of power to the load is generated by the load power requesting section.

2. The battery charging system as claimed in claim 1, wherein the controlling section is configured to distribute the supply power from the external power source between the battery and the load while continuing the limitation of limiting the supply power from the external power source to the allowable battery power, when a state of charge (SOC) of the battery is higher than or equal to a predetermined value and at the same time the request for the supply of power to the load is generated by the load power requesting section.

3. The battery charging system as claimed in claim 1, wherein the calculating section is configured to change the allowable battery power to a value as an after-change value in accordance with a change in a condition of the in-vehicle battery, and
the controlling section is configured to limit the supply power to the allowable battery power by using the after-change value of the allowable battery power when the allowable battery power is changed to the after-change value by the calculating section while power is supplied to the load in the state of holding the limitation of limiting the supply power to the allowable battery power.

4. The battery charging system as claimed in claim 1, wherein the controlling section is configured to supply the request load power to the load in a case of a mode of giving priority to power supply to the load.

5. The battery charging system as claimed in claim 1, wherein the controlling section is configured to control the supply power to the load to make a maximum value of the supply power to the load smaller than the allowable battery power in a case of a mode of giving priority to a charging operation of charging the battery.

6. The battery charging system as claimed in claim 1, wherein the controlling section is configured to continue the limitation of limiting the supply power from the external power source, to the allowable battery power without decreasing the allowable battery power when the request for the supply of power to the load is generated by the load power requesting section.

7. The battery charging system as claimed in claim 1, wherein the load is a pulse-driven load arranged to be pulse-driven with the power supplied through the heavy electric line.

8. The battery charging system as claimed in claim 1, wherein the controlling section is configured to limit the power supplied from the external power source to the allowable battery power when the power is not supplied from the external power source to the battery.

9. A battery charging system, comprising:
a heavy electric line adapted to make electrical connection with an external power source;
an in-vehicle battery connected electrically with the heavy electric line and arranged to be charged with power supplied through the heavy electric line;
a load connected electrically with the heavy electric line and arranged to receive power supplied through the heavy electric line;
a setting section configured to set a charging power allowable by the battery, as an allowable battery power;
a battery power requesting section configured to request supply of charging power to the battery;

a load power requesting section configured to request supply of power to the load; and a controlling section configured to control supply power to be supplied from the external power source to the battery and the load, in accordance with a request charging power from the battery power requesting section and a request load power from the load power requesting section, the controlling section being configured:
- to calculate, as a minimum driving power, a minimum value of the supply power to the load in a driving operation of driving the load in accordance with the request load power of the load power requesting section in response to a request of the load power requesting section for the supply of power to the load,
- to calculate, as a target load driving power, a power which is within a range of surplus power determined by a difference between an available supply power that the external power source can supply and a power supplied to the in-vehicle battery, and which is lower than or equal to the minimum driving power,
- to set, as a limit power, a sum of the target load driving power and the allowable battery power, and
- to distribute the supply power from the external power source between the battery and the load within a range of limitation of limiting the supply power from the external power source to the battery to the limit power.

10. The battery charging system as claimed in claim 9, wherein the load is a pulse-driven load arranged to be pulse-driven with the power supplied through the heavy electric line.

11. The battery charging system as claimed in claim 10, wherein:
- the pulse-driven load is configured to be driven by a periodical driving power varying periodically between a maximum value and a minimum value, and
- the controlling section is configured to calculate, as the minimum driving power, the minimum value of the periodical driving power.

12. The battery charging system as claimed in claim 10, wherein the pulse-driven load is configured to be driven by a periodical driving power varying periodically between a minimum value and a maximum value which is set lower than the allowable charging power.

13. A method of charging a battery and driving a load, with power supplied from an external power source, the method comprising:
- a first step of imposing limitation for limiting power supplied from the external power source to the battery to an allowable battery power; and
- a second step of determining whether a load power request for supplying driving power to the load is generated, and continuing the limitation when it is determined that the load power request is generated.

* * * * *